United States Patent [19]

Munday

[11] 4,340,963
[45] Jul. 20, 1982

[54] METHODS AND SYSTEMS FOR THE CORRECTION OF ERRORS IN DATA TRANSMISSION

[75] Inventor: Peter J. Munday, Reading, England

[73] Assignee: Racal Research Limited, Bracknell, England

[21] Appl. No.: 205,437

[22] Filed: Nov. 10, 1980

[30] Foreign Application Priority Data

Nov. 17, 1979 [GB] United Kingdom ................. 7939825

[51] Int. Cl.³ .............................................. G06F 11/10
[52] U.S. Cl. ......................................... 371/37; 371/43
[58] Field of Search ....................... 371/37, 38, 39, 40, 371/43

[56] References Cited

U.S. PATENT DOCUMENTS

| | | | |
|---|---|---|---|
| 3,805,236 | 4/1974 | Battail | 371/43 |
| 3,818,442 | 6/1974 | Solomon | 371/37 |
| 4,020,461 | 4/1977 | Adams et al. | 371/37 |
| 4,087,787 | 5/1978 | Acampora | 371/43 |
| 4,240,156 | 12/1980 | Doland | 371/43 |

OTHER PUBLICATIONS

Peterson and Weldon, Error-Correcting Codes, Second Edition, The MIT Press, 1972, pp. 6-10.

Primary Examiner—Charles E. Atkinson
Attorney, Agent, or Firm—Leydig, Voit, Osann, Mayer & Holt, Ltd.

[57] ABSTRACT

The invention relates to the correction of errors in received data, such as binary data. The system described monitors the actual level of signal representing each received data bit in a received data block so as to produce for each bit a first signal output representing the particular binary value of that bit and a second signal output representing the degree of probability of the bit having that particular value. The system generates, in response to the received block of data and using a very fast algorithm, a plurality of further, mutually different, blocks of data in each of which up to a predetermined number (the same for all the generated blocks) of the bits differ in binary value from the corresponding bits in the received data block. It produces for each of these further data blocks, in response to the values of the said second signal outputs respectively corresponding to the bits in the received block of data, a signal level representing the degree of probability that that further block of data is the same as the block of data originally transmitted. This enables the system to determine which of the further blocks of data is most likely to equal the transmitted block of data.

7 Claims, 2 Drawing Figures

METHODS AND SYSTEMS FOR THE CORRECTION OF ERRORS IN DATA TRANSMISSION

BACKGROUND OF THE INVENTION

The invention relates to the correction of errors in received data, more specifically received binary data. Thus, for example, the invention can be applied to decode error correction codes and so correct the received data, and makes use of soft decision and maximum likelihood decoding (correcting up to a given number of errors). It employs a fast algorithm to be described in detail below.

BRIEF SUMMARY OF THE INVENTION

According to the present invention, there is provided a method of correcting errors in a block of data received via a transmission link, in which the block of data is made up of a plurality of data symbols each of which can have any one of a plurality of predetermined data values, comprising the steps of: monitoring the actual level of signal representing each received data symbol whereby to produce for each symbol a first signal output representing the particular data value of that symbol and a second signal output representing the degree of probability of the symbol having that particular data value; generating, in response to the received block of data, a plurality of further, mutually different, blocks of data in each of which up to a predetermined number (the same for all the generated blocks) of the symbols differ in data value from the corresponding symbols in the received data block; and producing for each of the said further data blocks, in response to the values of the said second signal outputs respectively corresponding to the data symbols in the received block of data, a signal level representing the degree of probability that the further block of data is the same as the block of data input to the transmission link, and thereby determining which of the said further blocks of data is most likely to equal the transmitted block of data.

According to the present invention, there is also provided a system for correcting errors in a block of data received via a transmission link, in which the block of data is made up of a plurality of data symbols each of which can have any one of a plurality of predetermined data values and is represented by a respective signal, comprising: monitoring means connected to receive the said signals and to monitor the actual level of signal representing each received data symbol whereby to produce for each symbol a first signal output representing the particular data value of that symbol and a second signal output representing the degree of probability of the symbol having that particular data value; generating means operative to generate, in response to the received block of data, a plurality of further, mutually different, blocks of data in each of which up to a predetermined number (the same for all the generated blocks) of the symbols differ in data value from the corresponding symbols in the received data block; and output means operative to produce for each of the said further data blocks, in response to the values of the said second signal outputs respectively corresponding to the data symbols in the received block of data, a signal level representing the degree of probability that that further block of data is the same as the block of data input to the transmitted link, and thereby determining which of the said further blocks of data is most likely to equal the transmitted block of data.

DESCRIPTION OF THE DRAWINGS

Data error correction methods and systems according to the invention will now be described, by way of example, with reference to the accompanying diagrammatic drawings in which.

DESCRIPTION OF PREFERRED EMBODIMENTS

Figure 1:
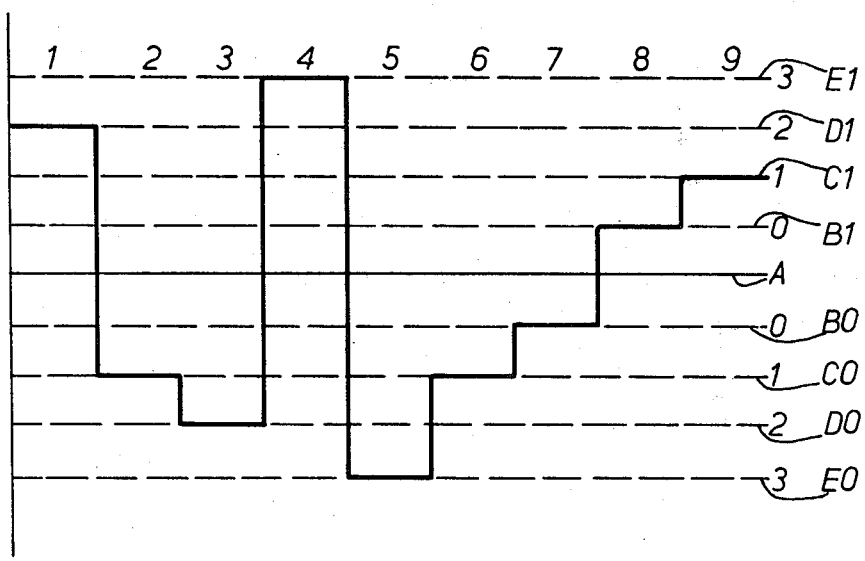
FIG. 1 shows a block of received data for explaining the operation of the system.

The methods and system now to be more specifically described correct errors in a block of received data bits by using "soft decisions," that is, decisions made by using "confidence data" obtained from the data receiver. It is also a limited "maximum likelihood decoder" in that it determines the possible errors which might exist in the received data block up to a specified maximum number of errors and assesses which of those errors has the highest probability. The system employs "confidence data" in a manner to be explained in detail. Confidence data is data produced by the data receiver in dependence on the magnitude (in relation to a datum electrical level) of the electrical signal representing each data bit. In theory, of course, all bits will have the same magnitude in relation to the datum level, with each one "1" bit having one polarity with respect to the datum level and each "0" bit having the opposite polarity. In practice, however, because of noise and other effects, the data bits will not necessarily all have that magnitude. The receiver will therefore determine, during each bit period, that a signal will be either a "1" or a "0" bit depending on its polarity with respect to the datum level. In the system being described, the actual magnitude, in relation to the datum, of each bit is measured and quantised into a number of levels to produce a figure for the "confidence" of each bit in dependence on the amount by which the magnitude of the bit exceeds the datum level. Thus, FIG. 1 shows a block of 9 received bits. The solid line A represents the datum level, and the dotted lines B1, C1, D1, E1, B0, C0, D0, and E0 represent "confidence levels." Specifically, lines B1 and B0 represent a confidence level, c, of, 0, lines C1 and C0 each represent a confidence level $c=1$, lines D1 and D0 each represent a confidence level $c=2$ and lines E1 and E0 each represent a confidence level $c=3$.

Therefore, in the block of data shown in FIG. 1 by way of example, data bits numbers 1, 4, 8 and 9 are "1" bits having confidence levels $c=2$, $c=3$, $c=0$, and $c=1$, respectively. Bits numbers 2, 3, 5, 6 and 7 are classed as "0" bits having respective confidence levels of $c=1$, $c=2$, $c=3$, $c=1$ and $c=0$, respectively.

It will now be assumed that a block of data bits is transmitted from a transmitter to a receiver. The data is coded using an error correcting block code.

Properties of the error correcting code are as follows. A block of n data bits is transmittted, k of which are information bits and the other n-k bits are parity bits. At the receiver, provided there are not more than t of the bits in error, the original data block transmitted can be determined. The code makes use of a generator polynomial $G(x)$.

The block of transmitted data can be represented by the polynomial T(x). For example, if n=9, then the transmitted data block might be

101101101

This could be represented by the polynomial T(x), where $$T(x) = 1 \cdot x^9 + 1 \cdot x^7 + 1 \cdot x^6 + 1 \cdot x^4 + 1 \cdot x^3 + 1 \cdot x^1 \quad (1)$$

The terms in $x^8$, $x^5$ and $x^2$ are zero because the bits in these positions are "0" bits.

The error correction code is implemented by arranging that the transmitted data block T(x) is a multiple of the generator polynomial G(x); this is done by suitably choosing the (n−k) parity bits.

If the data block received at the receiver is represented by the polynomial R(x), then $$R(x) = T(x) + E(x), \quad (2)$$

where E(x) is a polynomial representing the pattern of errors (if any) which exists between T(x) and R(x). That is, E(x) represents a block of bits consisting of a "0" bit in each bit position where there is no error between T(x) and R(x) and a "1" bit in each bit position where there is such an error. Clearly, for any particular values for T(x) and R(x), there are a large number of possible error patterns E(x). In other words, for any particular value of R(x), there are a large number of possible transmitted data blocks T(x). In a manner to be more specifically described, the system generates, in response to a particular received data block R(x) a number of possible values for T(x) (each a multiple of G(x)), each of which differs from R(x) in a different pattern of bit positions. Then, using the confidence information described above with reference to FIG. 1, it assesses which particular value of T(x) is the most likely value. For practical reasons, the system has to limit the number of possible values for T(x) which are calculated and assessed in this way, and this is done by generating all those values for T(x) which differ from R(x) in up to p bits (these values for T(x) are represented generically by $T_i(x)$).

The system uses the confidence data to assess the validity of each generated $T_i(x)$ by calculating the "soft weight" of each $T_i(x)$, that is, the summation of the number of confidence steps (steps in the values of c) between the value of each bit in $T_i(x)$ and the value of the corresponding bit in R(x).

The soft weight is calculated in the following manner.

Consider a case where

R(x) = 1 0 0 1 0 0 0 1 1 (as in FIG. 1), and $T_i(x)$ = 1 0 1 1 0 1 0 1 1, where $T_i(x)$ is one of the generated data blocks to be tested for its soft weight. As will be seen, in this case the particular value assumed for $T_i(x)$ differs from R(x) in that it assumes that there are errors in R(x) in the third and fifth bit positions.

The confidence value, c, for each bit in R(x) will be known, being derived by measurement carried out by the receiver. The confidence value for each bit can be 0, 1, 2 ... m (in the example considered in FIG. 1, m=3). If $c_1$ represents the value of c for the bit in bit position 1 of R(x), $c_2$ represents the value of c for the bit in bit position 2 of R(x), and so on, then the "soft weight" of the bit in the first bit position of $T_i(x)$ is represented as $(m - c_1)$—because each bit transmitted is assumed to be transmitted with the maximum confidence level, m, and $(m - c_1)$ therefore represents the number of confidence steps between the bit in the first bit position of $T_i(x)$ and the corresponding bit in R(x). The soft weight of the bit in the second bit position of $T_i(x)$ can be represented by $(m - c_2)$. In general, therefore, for each bit position, $j''$, where there is no error between R(x) and $T_i(x)$, the soft weight can be represented by $(m - c_{j''})$.

Further consideration is necessary for the soft weights of the bits in the bit positions where there is an error (the third and fifth bit positions in the example being considered). In such a case, because there is an error, the number of confidence steps between the bit in R(x) and $T_i(x)$ will not be (m−c) but will be (m+1+c). This is because the transmitted bit, assumed to have a confidence of m, will lie on one side of the datum line A (FIG. 1), while the received bit, having the confidence c, will lie on the opposite side of the line and their confidence values must be added (instead of subtracted as previously) in order to determine the number of confidence steps between them. A further one must be added as well to take account of the step from c=0 on one side of the datum to c=0 on the other side of the datum, making the total soft weight, w $[T_i(x)]$, of $T_i(x)$ to be $$w\,[T_i(x)] = \sum_{j''} (m - c_{j''}) + \sum_{j'} (m + 1 + c_{j'})$$

where the summations are respectively over all values of $j''$, which represents each bit position where there is no error, and over all values of j, which represents each bit position where there is an error. This can be rewritten as follows:

$$w\,[T_i(x)] = \sum_{j} (m - c_j) + \sum_{j'} (2c_{j'} + 1) \quad (3)$$

where j represents all the bit positions and j' again represents the bit positions where there is an error.

Therefore, the system calculates the soft weight w $[T_i(x)]$ for each $T_i(x)$ and then determines which $T_i(x)$ has the minimum soft weight. This value of $T_i(x)$ is the most likely transmitted data block.

It is apparent from Equation (3) above that the value of $T_i(x)$ having the minimum soft weight is that value of $T_i(x)$ for which $$\sum_{j'} (2c_{j'} + 1)$$

is a minimum, since $$\sum_{j} (m - c_j)$$

is the same for all of the values of $T_i(x)$. It is apparent that the minimum value of $$\sum_{j'} (2c_{j'} + 1)$$

is very unlikely to occur for the case where there are a large number of errors.

The manner in which all the data blocks $T_i(x)$ are generated from the received block R(x) will now be considered.

As stated above, T(x), the transmitted data block, is arranged to be a multiple of G(x). R(x) and T(x) are related by Equation (1) above, and if R(x) is divided by the polynomial G(x), the resulting remainder S(x) will therefore be the same as the remainder obtained by dividing E(x) by G(x). Therefore, S(x), the "syndrome" of the received block R(x), depends solely on the error pattern E(x) and not on the transmitted data block T(x). In other words, corresponding to each pattern of errors E(x) containing up to t errors (where t is less than p which was defined above), there is a unique syndrome S(x). Thus, corresponding to a particular syndrome S(x) there is at most one error pattern E(x) containing t or fewer errors, and the method of calculating this pattern will now be described.

E(x) can be rewritten as $$E(x) = E_1(x) + E_2(x) + E_3(x) \ldots E_t(x) \quad (4)$$

where each term contains not more than one error. The syndrome S(x) corresponding to E(x) can be written as $$S(x) = S_{E1}(x) + S_{E2}(x) + \ldots S_{Et}(x) \quad (5)$$

where each term is the syndrome corresponding to a particular one of the terms E(x).

The system includes a look-up Table, referred to below as TABLE A, which specifies for each S(x) one of the error terms (that is, $E_1(x)$ or $E_2(x)$ or ... $E_t(x)$) of the error pattern E(x) corresponding to that S(x) (or specifies a zero if there are no errors corresponding to that syndrome). The system also has a look-up Table (referred to below as TABLE B), which specifies for each error term $E_i(x)$ the corresponding syndrome term $S_{Ei}(x)$. The system then follows the following algorithm (referred to below as ALGORITHM A) to calculate E(x).

STEP 1: calculate S(x) by dividing R(x) by G(x) and determining the remainder

STEP 2: apply S(x) to TABLE A and thereby find the corresponding term of E(x), say $E_1(x)$.

STEP 3: apply $E_1(x)$ to TABLE B and thereby find the corresponding term of S(x), say $S_{E1}(x)$.

STEP 4: calculate $S'(x) = S(x) - S_{E1}(x)$.

STEP 5: apply S'(x) to TABLE A and thereby obtain another term of E(x), say $E_2(x)$.

STEP 6: apply $E_2(x)$ to TABLE B and find the corresponding syndrome term, that is $S_{E2}(x)$.

FURTHER STEPS: repeat until all the terms of E(x) have been found.

If the error correcting code is not a perfect code, there will be some syndrome patterns which do not correspond to a pattern of up to t errors. For these syndromes, in TABLE A one pattern of (t+1) errors corresponding to this syndrome is selected, and one of the error terms put into TABLE A. If in applying ALGORITHM A, one of these syndromes is found, a pattern of (t+1) errors can be found.

When all the terms of E(x) have been found using ALGORITHM A, corresponding value $T_i(x)$ can be calculated using Equation (2).

As applied above, ALGORITHM A calculates E(x) assuming that there are no more than t errors in the data block. In fact, the system is required to calculate all the values of E(x) containing up to p errors which result in R(x)−E(x) being a multiple of G(x). In order to do this, the system postulates a pattern containing up to (p−t) errors, thus:

$$F(x) = F_1(x) + F_2(x) \ldots F_{p-t}(x),$$

where each term $F_i(x)$ contains up to one error.

ALGORITHM A above is then applied to the received data block R(x)−F(x), and a unique error pattern E(x) is generated. E(x)+F(x) is then an error pattern containing up to p errors. If this process is repeated for all error patterns F(x) containing up to (p−t) errors, then all error patterns E(x)+F(x) which contain up to p errors and which make R(x)−E(x)−F(x) a multiple of G(x) will be generated.

This processs will now be described in more detail. Let $T_i(x)$ be the code word corresponding to error pattern E(x)+F(x). Then $$R(x) = T_i(x) + E_1(x) + E_2(x) \ldots + E_t(x) + F_1(x) \ldots F_{p-t}(x) \quad (6)$$

where each term $E_i(x)$ also contains up to one error.

Because $T_i(x)$ in Equation (6) is divisible by G(x), then, by analogy with Equation (5), $$S(x) = S_{E1}(x) + S_{E2}(x) + \ldots S_{Et}(x) + S_{F1}(x) \ldots + S_{Fp-t}(x) \quad (7)$$

Because the terms $F_1(x) + F_2(x) \ldots + F_{p-t}(x)$ represent (p−t) postulated errors, $S_{F1}(x) \ldots S_{Fp-t}(x)$ can be determined from TABLE B. S'(x) can then be calculated as $$S'(x) = S(x) - S_{F1}(x) \ldots - S_{F2}(x) \ldots - S_{Fp-t}(x) \quad (8)$$

It will be seen that by substituting for S(x) in Equation (8) from Equation (7), S'(x) can be rewritten as $$S'(x) = S_{E1}(x) + \ldots + S_{Et}(x) \quad (9)$$

(In the specific case of binary codes, the minus signs in Equation (8) could instead be plus signs but the result would be the same because the terms in $S_{F1}(x) + \ldots + S_{Fp-t}(c)$ cancel out by binary addition).

Therefore, this calculated value of S'(x) produces a value for $S_{E1}(x) + \ldots + S_{Et}(x)$. By analogy with Equation (5) above, this enables the system to use ALGORITHM A to find $E_1(x) + E_2(x) \ldots + E_t(x)$. Then, using the assumed value for $F_1(x) + \ldots + F_{p-t}(x)$ and substituting that value, together with the value obtained by ALGORITHM A for $E_1(x) \ldots E_t(x)$, in Equation (6), $T_i(x)$ is obtained. The system then calculates, for that value of $T_i(x)$, the variable part of the corresponding soft weight $w[T_i(x)]$, this variable part being of course $\Sigma(2c_{j'} + 1)$ where j' represents all the bit positions in $T_i(x)$ corresponding to the errors $E_1, E_2 \ldots E_t$ and $F_1, F_2 \ldots F_t$.

This process is then repeated with the next value for the postulated error pattern $F_1(x) + \ldots + F_{p-t}(x)$ so as to calculate the next value of $T_i(x)$, and the variable part of the soft weight of that term is calculated; and so on until all error patterns containing up to p−t errors have been postulated. All values of $T_i(x)$ differing from R(x) in up to p bits and which are also multiplies of G(x) will then have been calculated and so also will have been the corresponding variable part of the soft weight. This enables the particular term $T_i(x)$ having the minimum soft weight to be determined, as required.

Because ALGORITHM A is very fast, each $T_i(x)$, and the corresponding variable part of its soft weight, cam be generated very quickly. Therefore, a large number of code words $T_i(x)$ can be tested. In other words, p can be large. There are $2^k$ code words in total and this is normally so large that it would not be practical to calculate the soft weight for all of them. However, because of the speed of ALGORITHM A, p can be larger than might otherwise be the case.

Figure 2:
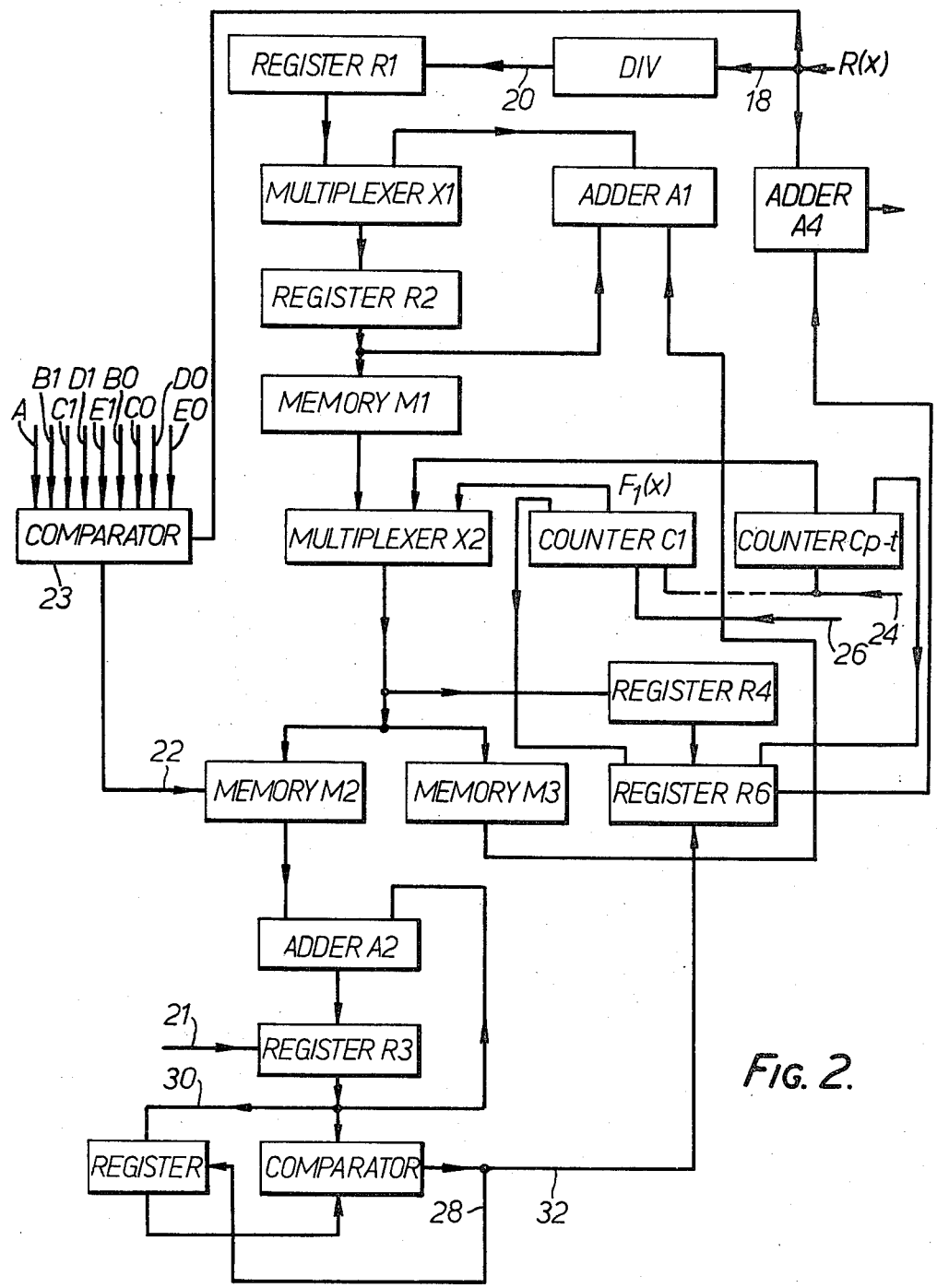
FIG. 2 is a block diagram of hardware for implementing the system.

FIG. 2 shows one practical form which the system can take and will now be described.

The system has six registers R1 to R6 (for example edge-triggered latches); two multiplexing circuits X1 and X2 (which may be effected by wired OR gates); three memories M1 to M3; (p−t) counters, C1, C2 ... C(p−t); three adders A1, A2 and A3 (A1 being a modulo 2 adder); a comparator COM, and a divider DIV. The functions of some of the components are as follows (the functions of the remainder are explained later):

REGISTERS

R1 contains the syndrome $S(x)$. This is calculated in the divider DIV which receives $R(x)$ on a line 18 and divides $R(x)$ by $G(x)$. The resultant value for $S(x)$ is fed to register R1 on line 20. (The functions of the register R1 and the divider DIV could in practice be combined).

R2 is for storing the intermediate syndrome values.

R3 holds the cumulative value at any time of $\Sigma(2c_j+1)$. It has a reset line 21.

R4 has t storage locations and is for storing the error pattern $E_1(x) + \ldots + E_p(x)$ which is current at any time during operation of the system.

R5 contains the minimum value of $\Sigma(2c_j+1)$ found up to any instant during operation of the system.

R6 contains p storage locations and stores the error pattern corresponding at any time to the current minimum value of $\Sigma(2c_j+1)$ in R5.

MEMORIES

M1 stores for each value of syndrome $S'(x)$ the value of one error term $E_i(x)$ in the error pattern corresponding to that syndrome, and outputs this error term when addressed by the given value of $S'(x)$. This memory therefore stores a Table corresponding to TABLE A of ALGORITHM A and can be a read-only memory storing pre-calculated information.

M2 is a read/write memory. For each error term $E_i(x)$ or $F_i(x)$, it stores the confidence value measured by the receiver for the bit in $R(x)$ corresponding to the bit position of that error term $E_i(x)$ or $F_i(x)$. The confidence value is stored in the form $(2c+1)$. If $E_i(x)$ contains no error, the value stored is zero. M2 outputs the appropriate confidence value when addressed by the given error term $E_i(x)$ or $F_i(x)$. Information is fed into memory M2 by means of line 22 from the receiver in response to each received data block $R(x)$. Line 22 is the output of a comparator 23 which receives the bits of the data block $R(x)$ and compares the level of each such bit with predetermined and successively different reference levels A, B1, C1, D1, E1, B0, C0, D0 and E0 (corresponding to those of FIG. 1) so as to assess the confidence level of each bit. M3 stores for each error term $E_i(x)$ or $F_i(x)$ the value of the corresponding syndrome term $S_{Ei}(x)$ or $S_{Fi}(x)$. If $E_i(x)$ or $F_i(x)$ contains no error, then the stored value is zero. This memory therefore stores a Table corresponding to TABLE B of ALGORITHM A and can be a read-only memory carrying pre-calculated information.

COUNTERS

The counters C1 to C(p−t) are used to set up each postulated error pattern $F_1(x) + \ldots + F_{p-t}(x)$. The counters are set up by means of lines 24 to the first postulated error pattern and are then advanced at each step of the algorithm to which the system works (in a manner to be explained) by means of line 26.

COMPARATOR

This compares the contents of registers R3 and R5. If, at the end of an iteration (see below), it determines that the contents of register R3 are less than those of register R5 it loads the contents of R3 into R5 by means of lines 28 and 30. In this way, R5 contains the minimum value of $\Sigma(2c_j+1)$ at any time. In addition, when the comparator determines that the contents of R3 are less than R5, it loads the contents of register R4, and the settings of counters C1 to C(p−t), into register R6 by means of a line 32.

The syndromes $S(x)$, $S'(x)$ and $S_{Ei}(x)$ can conveniently be represented by binary signals on (n−k) parallel lines.

The error patterns $E_i(x)$, $F_i(x)$ can conveniently be represented by binary numbers 0 to n. Binary number 0 indicates no error. Each binary number in the range 1 to n gives the position of the error corresponding to the particular error pattern.

The circuitry operates in accordance with the following algorithm:

STEP I: Calculate syndrome $S(x)$ by loading $R(x)$ into DIV on line 18 and load syndrome $S(x)$ into R1 by means of line 20.

STEP II: Load the contents of R1 into R2 by means of multiplexer X1 and reset R3 to zero by means of its reset line 21.

STEP III: Set up the first error pattern $F_1(x) + \ldots + F_{p-t}(x)$ on counters C1 to C(p−t) by means of line 24.

STEP IV: Address M2 and M3 with $F_1(x)$ from counter C1 by means of multiplexer X2. Therefore, M2 produces the confidence value $(2c_j+1)$ corresponding to $F_1(x)$ and M3 produces the syndrome $S_{F1}(x)$ corresponding to $F_1(x)$.

STEP V: Add the output of M2 into R3 by means of adder A2 and add (modulo 2) the output of M3 to the contents of R2 by means of adder A1 and multiplexer X1, storing the result back in R2.

STEP VI: Repeat STEPS IV and V for $F_2(x)$ from counter C2, then repeat again for $F_3(x)$ from counter C3; and so on up to $F_{p-t}(x)$. At the end of this process, therefore, R2 is storing the value of $S'(x)$ given in Equation (8) above.

STEP VII: Address M1 with $S'(x)$ from R2. This causes M1 to produce the corresponding error term $E_1(x)$.

STEP VIII: Address M2 and M3 with the output $E_1(x)$ of M1, and store $E_1(x)$ in the first storage location of R4. Memory M2 therefore produces the confidence value $(2c_j+1)$ of the bit in $R(x)$ in the bit position corresponding to $E_1(x)$. Memory M3 produces the syndrome term $S_{E1}(x)$ corresponding to $E_1(x)$.

STEP IX: Repeat STEP V so as to add the confidence value output of memory M2 to the contents of register R3 (via adder A2), and so as to add the output of M3, which is the syndrome term $S_{E1}(x)$ corresponding to $E_1(x)$, to the term $S'(x)$ stored in R2.

STEP X: Repeat STEPS VII to IX a further (t−1) times so that memories M2 and M3 produce all the different values for $E_1(x), E_2(x), \ldots E_t(x)$. At the end of this step, register R3 contains the cumulative value for $\Sigma(2c_j-1)$. For a non-perfect code, it will be necessary to check that the contents of R2 are zero at the end of this step to ensure that all the errors have been found. If R2 is non-zero, the iteration should be aborted.

STEP XI: Compare the contents of R3 and R5 in comparator COM. If this is the first occurrence of this step, register R5 will be empty, and the contents of R3 are therefore loaded into R5 by the comparator under control of lines 28 and 30. If this is not the first occurrence of this step, then register R5 will contain the minimum value of $\Sigma(2c_j+1)$ found so far. If the comparator COM determines that the contents of R3 are less than R5, then it loads the contents of R3 into R5. At the same time, it loads the contents of R4 and counters C1 to C(p−t) into R6 by means of line 32. The end of this STEP concludes one iteration.

STEP XII: Repeat STEPS II to IX as many times as necessary, each time using a different error pattern $F_1(x)+ \ldots +F_{p-t}(x)$ as set up on the counters C1 to C(p−t).

STEP XIII: Read out of R6 the error pattern $E_1(x)+ \ldots +E_t(x) +F_1(x)+ \ldots +F_{p-t}(x)$ corresponding to the minimum value of $\Sigma(2c_j+1)$. This is the most likely error pattern and enables the most likely value of $T_i(x)$ to be generated from Equation (2). This can be done by the adder A3, which receives R(x) on line 18.

The circuitry may generate a particular $T_i(x)$ several times but of course this will not prevent the system from determining which $T_i(x)$ is the most likely one.

If the system generates a value for E(x) containing errors in bit positions some at least of which correspond to the bit positions in the current postulated value for F(x), then the system will calculate the incorrect soft weight—because it will summate the confidence values of the bit positions containing errors in F(x) and then repeat the process for some of the same bit positions in E(x). However, this will not cause the system to produce the wrong value for the most likely $T_i(x)$ because a value for E(x) containing errors in the bit positions corresponding to the most likely $T_i(x)$ will also be generated in conjunction with a postulated value for F(x) not containing errors in the same bit positions, and in this case the system will generate the correct soft weight.

The circuitry could be adapted for use for non-binary codes. Adder A1 would be different in form; in particular, it would have to subtract $S_{E1}(x)$ from S'(x) at modulo the correct integer. In the foregoing analysis, "bits" would be "symbols," and memory M2 would contain confidence information for the probability of each received symbol being one of the other symbols.

What is claimed is:

1. A method of correcting errors in a block of data received via a transmission link, in which the block of data is made up of a plurality of data symbols each of which can have any one of a plurality of predetermined data values, comprising the steps of: monitoring the actual level of signal representing each received data symbol whereby to produce for each symbol a first signal output representing the particular data value of that symbol and a second signal output representing the degree of probability of the symbol having that particular data value; generating, in response to the received block of data, a plurality of further, mutually different, blocks of data in each of which up to a predetermined number (the same for all the generated blocks) of the symbols differ in data value from the corresponding symbols in the received data block; and producing for each of the said further data blocks, in response to the values of the said second signal outputs respectively corresponding to the data symbols in the received block of data, a signal level representing the degree of probability that the further block of data is the same as the block of data input to the transmission link, and thereby determining which of the said further blocks of data is most likely to equal the transmitted block of data.

2. A method according to claim 1, in which each data symbol is a binary digit (bit).

3. A method according to claim 2, in which each transmitted block of data is coded with an error correcting code and is representable by a polynomial which is made to be a multiple of a predetermined polynomial (which is the same for all the transmitted blocks of data) by the addition of parity bits.

4. A method according to claim 4, in which each said further block of data, $T_i(x)$, is generated by the steps of: dividing the received block of data, R(x), by the predetermined polynomial, G(x), to produce a remainder, S(x), which (because the transmitted block of data, T(x), is a multiple of G(x)) is equal to the remainder when E(x) is divided by G(x), where $R(x)=T(x)+E(x)$, and E(x) is the polynomial representing the pattern of errors between the transmitted and received data blocks; using a first source of pre-stored information which relates each value of S(x) to the value of one, $E_i(x)$, only, of the errors in the pattern of errors, E(x), corresponding to S(x) which was the minumum number of errors, to produce the value of the one, $E_i(x)$, of the errors corresponding to the particular value of S(x); using the value of this term $E_i(x)$, and a second source of pre-stored information which relates the value of each error term $E_i(x)$ of each error pattern E(x) to the value of the corresponding term, $S_{Ei}(x)$, in the corresponding remainder S(x), to produce the corresponding term $S_{Ei}(x)$; calculating S'(x) where $S'(x)=S(x)-S_{Ei}(x)$; using this value of S'(x) and the said first source of prestored information to produce another one of the terms, $E_i(x)$ of E(x); using this other value of $E_i(x)$ and the said second source of pre-stored information to produce another one of the terms, $S_{Ei}(x)$ of S(x); calculating the new value for S'(x) using the just determined value for $S_{Ei}(x)$; continuing this process until all the terms $E_i(x)$ have been produced, thereby generating E(x); and generating $T_i(x)$ by subtracting E(x) from R(x).

5. A system for correcting errors in a block of data received via a transmission link, in which the block of data is made up of a plurality of data symbols each of which can have any one of a plurality of predetermined data values and is represented by a respective signal, comprising: monitoring means connected to receive the said signals and to monitor the actual level of signal representing each received data symbol whereby to produce for each symbol a first signal output representing the particular data value of that symbol and a second signal output representing the degree of probability of the symbol having that particular data value; generating means operative to generate, in response to the received block of data, a plurality of further, mutually different, blocks of data in each of which up to a predetermined number (the same for all the generated blocks) of the symbols differ in data value from the corresponding symbols in the received data block; and output means operative to produce for each of the said further data blocks, in response to the values of the said second signal outputs respectively corresponding to the data symbols in the received block of data, a signal level representing the degree of probability that that further block of data is the same as the block of data input to the transmitted link, and thereby determining which of the said further blocks of data is most likely to equal the transmitted block of data.

6. A system according to claim 5, in which each data symbol is a binary digit (bit), and including means for coding each transmitted block of data with an error correcting code such that it is representable by a polynomial which is made to be a multiple of a predetermined polynomial (which is the same for all the transmitted blocks of data) by the addition of parity bits.

7. A system according to claim 6, in which the generating means comprises dividing means connected to divide the received block of data, R(x), by the predetermined polynomial, G(x), to produce a remainder, S(x), which (because the transmitted block of data, T(x), is a multiple of G(x) is equal to the remainder when E(x) is divided by G(x), where $R(x) = T(x) + E(x)$, and E(x) is the polynomial representing the pattern of errors between the transmitted and received data blocks; first storage means storing pre-stored information which relates each value of S(x) to the value of one, $E_i(x)$, only, of the errors in the pattern of errors, E(x), corresponding to S(x) which has the minimum number of errors; first comparing means operative to compare the values of S(x) with the prestored information to produce the value of the one, $E_i(x)$, of the errors corresponding to the particular value of S(x); second storage means storing pre-stored information which relates the value of each error term $E_i(x)$ of each error pattern E(x) to the value of the corresponding term, $S_{Ei}(x)$, in the corresponding remainder S(x); second comparing means responsive to each value $E_i(x)$ produced by the first comparing means and to the pre-stored information in the second storage means to produce the corresponding term $S_{Ei}(x)$; calculating means connected to calculate S'(x) where $S'(x) = S(x) - S_{Ei}(x)$; means responsive to each value of S'(x) and to the pre-stored information in the first storage means to produce another one of the terms, $E_i(x)$ of E(x); means feeding back each other value of $E_i(x)$ to the second comparing means to produce another one of the terms, $S_{Ei}(x)$, of S(x); and means feeding back each such other term, $S_{Ei}(x)$ to the calculating means to calculate the new value for S'(x) until all the terms $E_i(x)$ have been produced, thereby generating E(x); and subtracting means connected to subtract E(x) from R(x) to produce each said further block of data.

* * * * *